H. M. FULLER & G. A. SEWELL.
VEHICLE SIGNAL.
APPLICATION FILED JUNE 10, 1918.
1,287,281.
Patented Dec. 10, 1918.
2 SHEETS—SHEET 1.
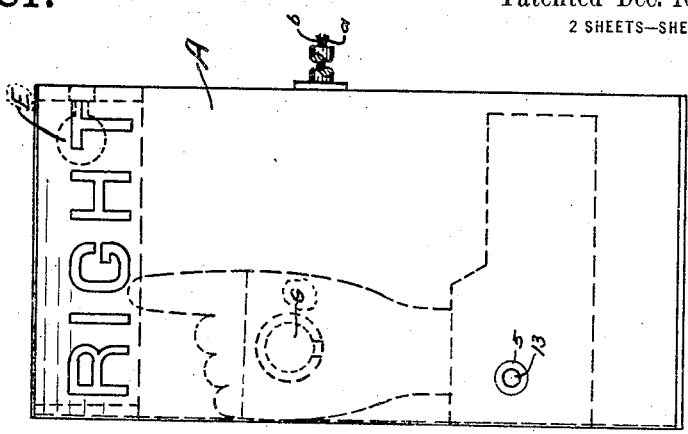
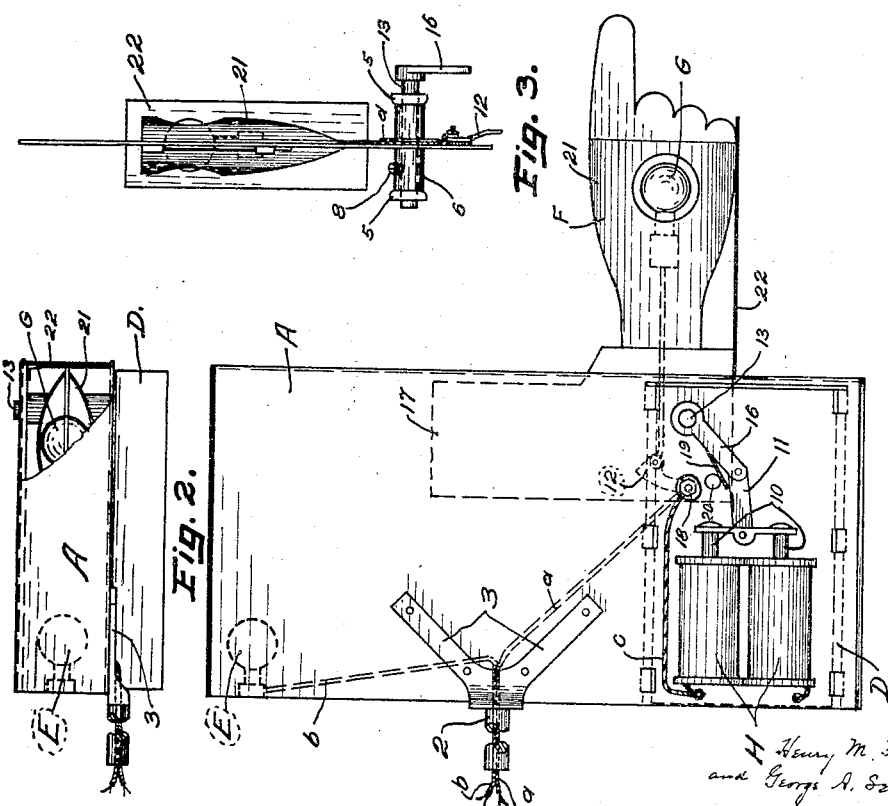
INVENTOR.
Henry M. Fuller
and George A. Sewell
BY J. M. Thomas
ATTORNEY

H. M. FULLER & G. A. SEWELL.
VEHICLE SIGNAL.
APPLICATION FILED JUNE 10, 1918.

1,287,281.

Patented Dec. 10, 1918.
2 SHEETS—SHEET 2.

Henry M. Fuller and
George A. Sewell
INVENTOR.
BY J. M. Thomas
ATTORNEY

UNITED STATES PATENT OFFICE.

HENRY M. FULLER AND GEORGE A. SEWELL, OF SALT LAKE CITY, UTAH.

VEHICLE-SIGNAL.

1,287,281.  Specification of Letters Patent.  Patented Dec. 10, 1918.

Application filed June 10, 1918. Serial No. 239,320.

*To all whom it may concern:*

Be it known that we, HENRY M. FULLER and GEORGE A. SEWELL, citizens of the United States, residing at Salt Lake City, in the county of Salt Lake and State of Utah, have invented certain new and useful Improvements in Vehicle-Signals, of which the following is a specification.

Our invention relates to vehicle signals, and has for its object to provide an electrically operated signal to be displayed on road vehicles, such as automobiles and trucks, to indicate the direction in which a moving automobile is intended to be driven, and which may be seen at night as well as in daylight.

These objects we accomplish with the device illustrated in the accompanying drawings in which similar letters and numerals of reference indicate like parts throughout the several figures and as described in the specification forming a part of this application and pointed out in the appended claims.

Figure 6:
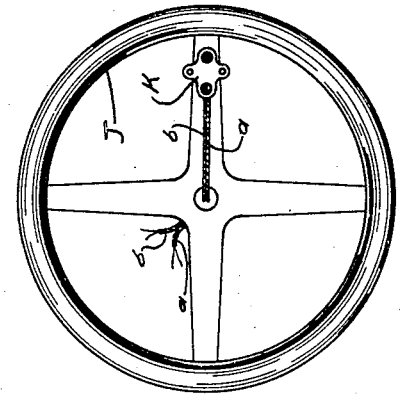
Figure 8:
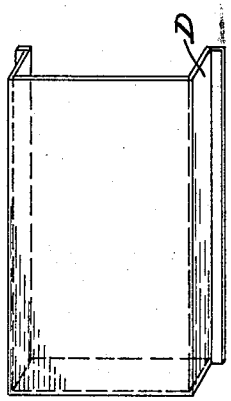
Figure 5:
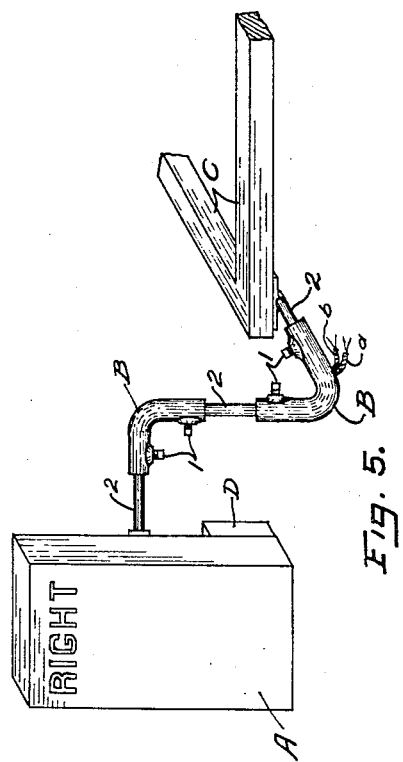
Figure 7:
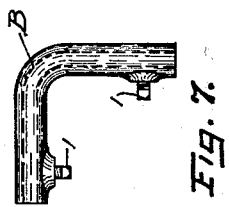

In the drawings in which we have shown a substantial embodiment of our invention, Figure 1 is a side elevation of the device with the indicator hand pointing to the left, and with the housing face removed to show the operating elements in elevation. Fig. 2 is a top plan view of the device parts cut away. Fig. 3 is a detail of the indicator and mounting therefor looking down on it. Fig. 4 is an elevation showing the reverse side of the case from that shown in Fig. 1. Fig. 5 is a view in perspective of the device fastened in place on the frame of an automobile. Fig. 6 is a plan view of a steering wheel of an automobile with the electric wires and switch shown. Fig. 7 is a plan view of one of the attaching sleeves. Fig. 8 is a view in perspective of the housing case used for covering the operating elements of the device. When road vehicles have their curtains fastened down it is diffcult for the driver to use his arm and hand to indicate the direction in which the machine will be driven at street crossings and other places where short turns to the right or left are to be made, and at all times it may be made easier to indicate the direction of turning by using a signal which can be quickly and easily operated by the driver.

The present invention is intended to provide such a signal and consists of a housing or case A which may be secured on the side of the vehicle body or some portion thereof, by the adjustable bracket shown in Fig. 5. The said bracket consists of two sleeves B bent at right angles and in which are provided set screws 1, by means of which short lengths of pipe 2 may be fastened together, and one of which is to be secured on the body C of the vehicle and another on said case A by having its end portion bifurcated as at 3. The said bracket enables us to fasten the device on any make of vehicle and at almost any desired place and have the signal plainly visible. The said case A has a removable top and bottom for convenience in setting the signal, and externally on one side face a waterproof housing D is provided in which the index operating mechanism is placed. Within the upper portion of said case A is mounted an electric light globe E for the purpose of illuminating a sign "Right" which sign is cut in the side of said casing and covered with translucent colored material. Within the lower portion of said case A is pivotedly mounted the index F preferably we give this the form of a hand with closed fingers. All of the hand except the fingers is covered with a shield piece 21 which is hollow and in which the electric globe G is mounted. A portion of each side of the said shield is cut out, and a colored translucent plate is inserted within the hand and covering the said cuts and globe G, but not covering any of the fingers. The outer end of said shield is left open and the fingers of the index are painted white, in order that when said globe G is illuminated by the current the cut out portion of said shield will show a colored light and the fingers will be illuminated on both sides with white light. The edge of said casing A is cut out to allow the said index hand to be turned on its shaft and within said casing A or to be turned to a horizontal position without the casing. The said casing and hand are suitably packed to prevent rattling. A closure piece 22 is attached to said hand to form a covering for the cut out portion of the edge of said casing when the index hand is within the casing.

Said index F is pivotedly mounted in said case A by being secured on the sleeve 6 having ball bearing cases 5 on each end thereof and a set screw 8 is operatively inserted through the wall of said sleeve to engage a shaft 13, that is journaled in said sleeve and on which is a crank arm 16 by which said shaft and index F is operated. The said arm 16 is placed within the waterproof housing D and a spring 19 is secured on said shaft 13 by which said index F is partially made to rotate with said shaft with case A as a bearing therefor. An electromagnet H, or two solenoids are mounted in said housing D with their cores 10 connected with said crank arm 16 by a link 11. A spring contact member 12 is secured on a weight member 17 which member is integral with or secured on said index F at the wrist. Said contact spring 12 is adapted to be brought into contact with a post 18, both of which are insulated from their supports, by which an electric circuit is completed to illuminate the electric light globe G. Wires $a$ and $b$ are connected with a source of electric energy, preferably a battery on the vehicle, and are passed through said pipes 2 and angle sleeves B by which the current is carried to the device. A wire $c$ is connected at one end with said post 18 and at the other end with said solenoids H through the link 11 and arm 16 to carry electric current through the solenoids. Said wires $a$ and $b$ are carried to the steering wheel J of the vehicle and connected with a switch K mounted on said steering wheel. Wires $d$ are connected with said electric light globe G and one of which is carried to said contact spring 12.

The operation of our device is as follows:—

With the wires $a$ and $b$ connected with a source of electric energy and leading to the said globe E, and to said contact post 18 and globe G, and also the wire $c$ connecting said contact post 18 and the solenoids H and when the switch K is operated and the circuit completed the solenoids act on their plungers 10 and arm 16 and partially rotate the shaft 13 and bring the index F to a horizontal position as shown in Fig. 1 with the light globe G illuminated.

The weight 17 is so positioned as to the index F that it will be the moving force for said index F when the index is nearly vertical, and at all other times the moving force for said index is the solenoids H and the spring 19. When the said index F is positioned within the case A and an electric circuit is completed by the switch K the force of the solenoids H will be exerted through the arm 16 on the shaft 13 and the index F will be started toward the horizontal position, when the index has reached about the position of 45 degrees the free end of said spring 19 will engage an extended lug 20 and continuing said movement tension will be given said spring 19. At about the time the said spring 19 engages said lug 20, the spring contact member 12 will be brought in touch with the post 18 and an electric circuit will be completed through the globe G, and the hand will be illuminated. The power of the solenoids H will continue to be exerted as long as the current is passing and when the circuit is broken by operating the switch K, the spring 19 will start the index F on its return to the vertical position, and when said index has passed the 45 degrees position the tension of said spring 19 will cease as the moving force on said index and the weight 17 will begin to act on said index F and cause it to assume the vertical position.

We thus provide a compact visible signal for night or day use, which is operated by new and novel electric and weight means.

Having thus described our invention we desire to secure by Letters Patent and claim:—

A signal device comprising an index in the form of a hand; a shield covering all of the hand except the fingers and open on the end adjacent the fingers and having portions cut out; an electric light globe mounted in said shield adjacent said cut out portions adapted to illuminate the fingers of said index hand; a translucent colored plate covering said electric globe and closing the cut out openings; a casing in which said index hand is pivoted; a weight operated within said casing and attached to said index hand so positioned relative to said hand as to move said index hand on its pivot when the hand is near a vertical position and not to act when the hand is near a horizontal position; a contact spring member secured on said index hand within said casing; a contact post in the path of said contact spring member; an electromagnet to move said index hand on its pivot; and wire connecting a source of electric energy with said electromagnet and said electric light globe.

In testimony whereof we have affixed our signatures.

HENRY M. FULLER.
GEORGE A. SEWELL.